(12) United States Patent
Houy et al.

(10) Patent No.: US 7,331,330 B2
(45) Date of Patent: Feb. 19, 2008

(54) DEVICE TO ATTACH A FUEL RETURN LINE TO A FUEL INJECTOR AND DEVICE TO SUCTION FUEL FROM A FUEL INJECTOR

(75) Inventors: Sylvain Houy, Wiesloch (DE); Daniel Saxer, Altussheim (DE); Thomas Vierneisel, Bensheim (DE); Yan Kornatz, Antony (FR); Valeri Arendt, Marsberg (DE); André Häckel, Korbach (DE); Detlef Stuhldreier, Marsberg (DE)

(73) Assignee: Cooper Standard Automotive, Inc, Novi, MI (US)

( * ) Notice: Subject to any disclaimer, the term of this patent is extended or adjusted under 35 U.S.C. 154(b) by 51 days.

(21) Appl. No.: 11/281,529

(22) Filed: Nov. 17, 2005

(65) Prior Publication Data
US 2006/0107928 A1    May 25, 2006

(30) Foreign Application Priority Data

| Nov. 25, 2004 | (DE) | ....................... 10 2004 058 466 |
| Nov. 29, 2004 | (DE) | ....................... 10 2004 059 343 |
| Dec. 17, 2004 | (DE) | ....................... 10 2004 062 446 |

(51) Int. Cl.
*F02M 37/04*    (2006.01)
(52) U.S. Cl. ...................................... 123/470; 123/514
(58) Field of Classification Search ................ 123/468, 123/469, 470, 514
See application file for complete search history.

(56) References Cited

U.S. PATENT DOCUMENTS

| 5,666,922 A | 9/1997 | Krimmer et al. ............ 123/470 |
| 5,690,079 A * | 11/1997 | Craig ........................... 123/538 |
| 5,979,411 A * | 11/1999 | Ricco ........................... 123/469 |
| 6,612,290 B2 * | 9/2003 | Nozaki et al. .............. 123/456 |
| 6,830,037 B1 * | 12/2004 | Braun et al. ................. 123/470 |

FOREIGN PATENT DOCUMENTS

| DE | 19505574 A1 | 12/1995 |
| EP | 0536427 | 4/1993 |
| EP | 0918156 A1 | 5/1999 |
| EP | 1416213 | 5/2004 |
| GB | 2088984 | 6/1982 |

OTHER PUBLICATIONS

German Official Report dated Nov. 11, 2005 from the corresponding German application.
European Search Report dated Feb. 9, 2006.
European Search Report dated May 9, 2006.

* cited by examiner

*Primary Examiner*—Thomas Moulis
(74) *Attorney, Agent, or Firm*—Young Basile Hanlon MacFarlane & Helmholdt PC

(57) ABSTRACT

A device to suction fuel from a fuel injector and a device to attach a fuel return line to a fuel injector with a C-shaped main body partially encircling the fuel injector having two retaining arms which abut the fuel injector and grip it from the back at least to a small degree, with a connector coacting with a drain passage of the fuel injector and at least one connecting fitting for the fuel return line. The connecting fitting and the connector are fluidically connected. The free ends of the retaining arms have a first section in which they are angled towards each other and towards the base of the main body.

41 Claims, 6 Drawing Sheets

DEVICE TO ATTACH A FUEL RETURN LINE TO A FUEL INJECTOR AND DEVICE TO SUCTION FUEL FROM A FUEL INJECTOR

BACKGROUND

It is known that fuel injectors are provided with fuel return lines through which the fuel which is not consumed at the fuel injector is returned to the tank. The fuel injector provides a drain passage for this purpose to which a connector for a retaining clamp can be attached. The retaining clamp for its part possesses a connecting fitting for the fuel return line. In this way, the excess fuel can be drawn off to the tank.

The retaining clamp is designed as a self-locking clip and has two retaining arms which partially encircle the fuel injector. Since the retaining clamp must not become detached from the fuel injector or loosen its seat during operation, it is seated relatively tightly on the fuel injector, which has the disadvantage that relatively high installation force is necessary to push the retaining clip onto the fuel injector.

Furthermore, devices for generating negative pressure by utilizing the venturi principle are sufficiently known. A flowing medium is accelerated by means of a restriction in the cross section, which reduces the pressure of the medium. The suction line opens into this area of reduced pressure so that a fluid can be sucked in through this suction line.

Fuel injectors possess a return line through which excess fuel is transported back to the tank. A slight negative pressure obtains in this return line so that the fuel is, so to speak, suctioned off by the fuel injector. This has the considerable advantage that the fuel injector does not have to build up positive pressure to remove the excessive fuel and that the return line does not have to be designed for pressure. A device which utilizes the venturi system is used to generate the negative pressure in the return line. The high-pressure line in which the pressurized fluid is flowing is connected, for example, to the fuel pump and is supplied with fuel under pressure. This fuel is accelerated in the device and thereby generates the necessary negative pressure for the return line to suction off the excess fuel from the fuel injector.

It would be desirable to provide a device of the type mentioned above with which, firstly, the installation force to push the device onto a fuel injector is reduced, secondly, the retaining force, or the pull-off force, is increased, or at least not reduced. It would be advantageous if the device consists of only a few parts and is simple to assemble and install.

SUMMARY

The invention relates to a device to attach a fuel return line to a fuel injector, having a C-shaped main body with two retaining arms which partially encircles the fuel injector, where the retaining arms abut the fuel injector and grip same from the back at least to a small degree, having a connector coacting with a drain passage for the fuel injector and having at least one connecting fitting for the fuel return line, where the connecting fitting and the connector are fluidically connected to each other.

The invention also relates to a device for attaching a fuel return line to a fuel injector having an essentially C-shaped body with two retaining arms which partially encircles the fuel injector, where the retaining arms abut the fuel injector, and having a connector coacting with a drain passage for the fuel injector and having at least one connecting fitting for the fuel return line, where the connecting fitting and the connector are fluidically connected to each other.

Finally, the invention relates to a device for suctioning fuel from a fuel injector, which is fluidically connected through a return line to the device, having a first connection for a high-pressure line, a second connection for the return line and a third connection for a drain line, where the connections are connected to a venturi system and the first connection opens into an injector nozzle and the second connection opens in the area of the outlet for the injector nozzle.

In accordance with the invention the free ends of the retaining arms have a first section in which they are angled towards each other and towards the base of the main body.

In contrast to Ω-shaped retaining clips, in which the free ends first approach each other and finally spread apart, or in which the free ends finally diverge, the free ends of the device in accordance with the invention converge and are additionally angled towards the base of the main body, or towards the center of the encircled fuel injector, that is to say, of the space for the fuel injector between the two retaining arms. The free ends of the retaining arms forming the first section extend, therefore, essentially radially with reference to the axis of the encircled fuel injector.

This achieves the considerable advantage that for the same material thickness, that is to say for the same wall thickness in the retaining arms, considerably higher pull-off force is achieved since the retaining arms, or the free ends of the retaining arms, grip the fuel injectors radially with their end faces. To obtain the same pull-off force as with Ω-shaped retaining clips, the wall thickness of the retaining arms can be substantially reduced, which reduces the installation force and thereby makes it easier to push the device onto the fuel injector. Assembly can be performed in this way with smaller equipment or even manually and without the assistance of a tool.

A refinement calls for the retaining arms to run parallel initially as they depart the base of the main body and then to have a second section in the area of their free ends in which they diverge. As with the Ω-shaped retaining clip, the two diverging areas create a fork-shaped location, which has the advantage that the device in accordance with the invention can easily be placed against the jacket of the fuel injector and, without the risk of slipping off, pushed radially onto the fuel injector and secured. The two diverging areas act as a shoulder and a guide for the device.

A third section in which the retaining arms run parallel again attaches to the second section. The second and the third section thus form an outer recess on each retaining arm, in which the retaining arms are spaced farther apart from each other. Since the first section attaches to the third section, the former can pivot into this recess or open space when the device is secured to the fuel injector so that the fuel injector can be pushed past the first section.

In accordance with one aspect, the retaining arms are not as thick in the first, second and/or third section as at the foot, that is to say, in the area of the base of the retaining arms. This has the considerable advantage that the retaining arms are designed to be relatively flexible in the insertion area of the device in accordance with the invention, so that the device can be pushed on the fuel injector with little effort. After the device is pushed onto the fuel injector, it is latched when the free ends assume a position in which they grip the fuel injector from behind and are aligned essentially radially to the longitudinal axis of the fuel injector. If the retaining device is pulled off the fuel injector from this position, the free ends of the retaining arms are not bent into the recess but in the other direction, that is to say, they are spread apart even farther and grip the fuel injector from the back even more.

Because the thickness of the retaining arms in one aspect of the invention decreases towards their free ends, this creates a situation in which they are relatively rigid in the area of their base, but relatively flexible in the area of their free ends. This also allows the retaining device to be pushed onto, or joined to, the fuel injector relatively easily.

In accordance with the invention, the retaining arms can be allowed to pivot a very small amount relative to their base by providing a slot between the main body and the retaining arms open at its edges in the direction of the free ends of the retaining arms. The retaining arms are thereby disconnected from the base of the main body to some extent so that the retaining arms not only abut the fuel injector laterally but can also exert a clamping force on the jacket of the fuel injector. This centers the retaining device on the fuel injector.

A relatively simple adjustment of the stiffness of the retaining arms can be achieved by stiffening ribs running in the longitudinal direction on the oppositely facing outer surfaces of the retaining arms. The width, length and/or height of these stiffening ribs can selected as desired. The ribs may come to a wedge-shaped point towards the free ends of the retaining arms, that is to say, their height and/or width can vary.

The free ends of the retaining arms can also be connected by a bail gripping the fuel injector from the back.

In contrast to Ω-shaped retaining clips in which the free ends first come closer together and finally spread apart, or in which the free ends finally diverge, the free ends of the retaining arms on the device in accordance with the invention are connected by means of a bail. This bail grips the fuel injector from the back and tensions the device against the fuel injector.

This bail preferably has a radius of curvature which is larger than the radius of the jacket of the fuel injector. As a result, the bail abuts the jacket of the fuel injector at several points or in linear fashion so that it has to be bent and thus tensioned in order to connect with the retaining arm.

In accordance with one aspect, the retaining arms run parallel as far as possible, starting from the base of the main body. In the area of its drain port the fuel injector has two flattened areas opposite each other on the outside onto which the two retaining arms can be pushed. The position of the retaining device against the fuel injector is thereby defined.

In one aspect, the bail is configured in such a way that it can be connected to both ends of the retaining arms. This bail is a loose component of the device in accordance with the invention and, after the two retaining arms are pushed onto the fuel injector, is slipped onto, latched or otherwise attached to the two free ends of the retaining arms.

In another aspect, the bail on the end of one retaining arm is formed in one piece, specifically by means of a film hinge. This variant has the considerable advantage that the bail is attached to the device under the invention so that it cannot be lost and it only needs to be swung over after the two retaining arms have been pushed onto the injector and latched onto the free end of the other retaining arm. To accomplish this, the free end of this retaining arm has a locking tab which grips the back of a locking hook provided, for example, on the bail. The locking tab extends radially from the retaining arm, for example, pointing away from the fuel injector.

In one aspect, the two retaining arms are connected not only at their base but also in an area which lies between the base and the open ends. In this way, the base can be formed by a relatively narrow bridge since the retaining arms are supported in the connecting area, in addition to the base. This area lies preferably in the middle between the base and the end of the retaining arm. The connection can, for example, be formed by a bridge from which the connector extends.

An optimal flush fit against the fuel injector can be achieved if the bridge is curved concavely in the direction of the connector. The curvature of the bridge essentially matches the diameter, or the outward or projecting convex form of the fuel injector.

Preferably, the wall thickness of the retaining arms is greater between its end and the connecting area than between the connecting area and the base. This creates relatively stiff free ends, where the section between the connecting area and the base is more flexible. When the two free ends of the retaining arms are spread apart, primarily the thinner-walled sections bend inward slightly so that the connecting area forms a joint. The thicker-walled sections of the retaining arms pivot around this joint.

In accordance with the invention, the bail is stiffened by providing an additional stiffening rib running in the longitudinal direction. This stiffening rib ensures that the bail lies against the jacket of the fuel injector under pretension after it has been latched to the opposite retaining arm and is holding the retaining device of the invention securely against the fuel injector.

In accordance with the invention, the device has two housing parts, each provided with a connection to which the high-pressure line and the drain line are attached. Since both the high-pressure line and the drain line carry fluid under pressure, they must be connected relatively tightly to the first and third connection. To achieve this, the connections usually have an outside diameter which is greater than the internal diameter of the lines. However, this means that the connections are pushed into the lines with a rotating motion. Since the device is constructed of two housing parts, each part of the housing can be handled independently of the other, which renders connecting the individual connection to the high-pressure line or the drain line considerably easier since the other part of the housing and the other line do not present any interference. Once the parts of the housing are pushed onto the lines, the parts of the housing can be joined together and the device completed.

In a refinement of the invention, the injector is a formed part of the first part of the housing. This means that the entire device in accordance with the invention consists of two components: the first housing part with the injector and first connection and the second housing part with the third connection. This reduces not only production costs but also assembly and warehousing costs.

Under the invention, the first housing part is configured essentially cartridge-shaped, with the injector located coaxially in the first housing part. The cartridge-shaped structure has the advantage that it is easily possible to manufacture the first housing part using injection molding technology, and there is no problem in forming the injector on the first housing part.

The second connection is preferably formed either at the first or at the second housing part. If the second connection is located on the second housing part, the latter can also easily be manufactured as an injection molded part, particularly from two housing shell halves which are joined by friction welding or ultrasonic welding.

The second housing part preferably has a cartridge-shaped axial extension which encircles the injector nozzle and locates same. When the first and second housing parts are joined, the injector nozzle is carried in the axial extension which defines the precise position of the outlet for the injector nozzle in the second housing part. This is achieved by the extension centering the injector nozzle in the radial direction, that is to say, aligning it coaxially and additionally defining the depth of insertion.

In accordance with one aspect, retaining arms extending in the axial direction are provided on the first housing part which partially overlap the second housing part and. In another embodiment, these retaining arms are provided on the second housing part and extend over the first housing part in the axial direction. In a preferred variant, the retaining arms are configured as locking arms. The two housing parts are connected to each other by means of these retaining arms, specifically they are latched together. For this reason, no tool is required for assembly and assembly can be carried out specifically by machine.

Optimal distribution of force and symmetrical design of the housing parts is achieved by providing two oppositely located retaining arms. These two retaining arms also ensure that the two housing parts are connected in a fluid-tight manner, so that no fuel escapes at the joint and no air is sucked in.

To position the retaining arms on the other housing part, it has retaining means in accordance with the invention. The possibility also exists that the two housing parts are not locked together but, for example, are joined by means of friction welding or ultrasonic welding. However, it is then no longer possible to separate the two housing parts, whereas with a latch fitting the two housing parts can be separated at any time.

In one aspect, the retaining means have locking tabs or locking slots and the retaining arms have locking slots or locking tabs. Such simply designed retaining means are inexpensive to produce, are easy to engage and are reliable, even over a long period, with respect to their engagement, the retaining force and any possible play.

In one aspect, the second housing part is provided with longitudinal guides for the retaining arms. When the two housing parts are joined, these longitudinal guides allow the retaining arms to be positioned easily against the other housing part and pushed onto same. The retaining arms specifically possess bevels at their free ends and may be configured in such a way that the two housing parts can be joined only when aligned to each other in one way, thereby precluding incorrect assembly.

The longitudinal guides preferably abut the retaining arms laterally. The possibility also exists that the longitudinal guides engage the retaining arms, specifically in the form of ribs in grooves which are provided on the radially inward longitudinal surfaces of the retaining arms.

In accordance with the invention, at least two longitudinal guides position a retaining arm between themselves. These longitudinal guides form, so to speak, a channel into which the retaining arm can be introduced. The longitudinal guides additionally support the retaining arm in the peripheral direction, which has the substantial advantage that torsional forces impinging on one housing part are not transferred to the other housing part by the latched connection but by the longitudinal guide. This is important, for example, after the housing parts have been joined, that is to say, with a completely assembled device, when the high-pressure line and/or the return line is pushed on or pulled off, since torsional forces affect the housing parts during this procedure. In this instance, the longitudinal guide serves to provide lateral support and protection for the latched connection.

In accordance with the invention, the longitudinal guide is formed by a radial projection or recess running in the longitudinal direction. As already mentioned, if the longitudinal guide is a projection, it can form part of a channel, whereas if the longitudinal projection is configured as a recess, it forms a guide groove which is formed into the housing wall in the longitudinal direction.

BRIEF DESCRIPTION OF THE DRAWINGS

Additional advantages, features and details of the invention can be found in the dependent claims and the subsequent description, in which particularly preferred embodiments are described in detail with reference to the drawing. The features shown in the drawing and mentioned in the description and the claims may be fundamental to the invention either individually or in any combination.

In the drawing.

DETAILED DESCRIPTION

Figure 1:
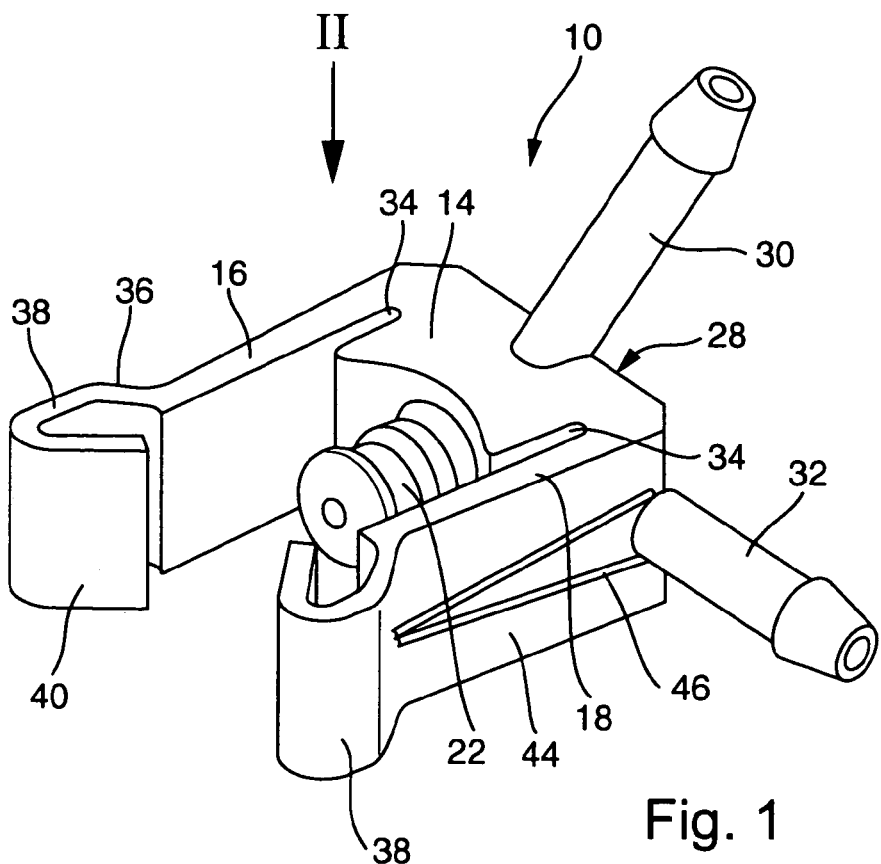
FIG. 1 is a perspective view of a retaining device in accordance with the invention.
Figure 2:
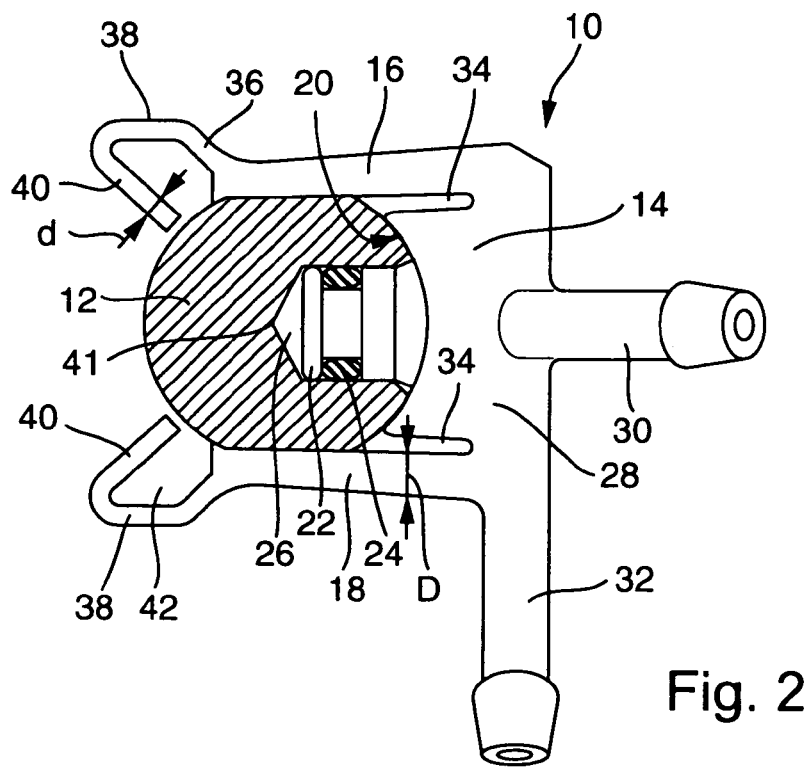
FIG. 2 is a plan view from FIG. 1 in the direction of arrow II.

FIG. 1 shows a retaining device identified overall as 10 which can be attached to a fuel injector 12 (see FIG. 2). The device 10 has a base 14 which is flanked on both sides by retaining arms 16 and 18. On the side facing the fuel injector 12, the base 14 has a concavity 20 which abuts the jacket of the fuel injector 12 when the retaining device 10 is installed. A connector 22, which is sealed by an O-ring 24 and sits in a return passage 26 for the fuel injector 12, projects radially from the concavity 20. The excess fuel from the fuel injector 12 is taken through this return passage 26 from the fuel injector 12 and to the connector 22.

The base 14 and the two retaining arms 16 and 18 form a main body 28 from which two connecting fittings 30 and 32 project onto which fuel return lines leading to the tank can be installed. The connecting fittings 30 and 32 are fluidically connected to the connector 22 so that the excess fuel can drain through the connecting fittings 30 or 32. The retaining device 10 can therefore be integrated into a common line.

It can be seen from FIG. 2 that a slot open at the edge 34 is provided between the retaining arms 16 and 18 and the base 14, creating a somewhat flexible connection for the retaining arms 16 and 18 to the base 14. The two retaining arms 16 and 18 can be bent open slightly, or abut the outer surface of the fuel injector 12 under pretension.

It can be seen further from the drawing that the two retaining arms 16 and 18 run essentially parallel to each other, or converge slightly, and have a first thickness D. At the end of their parallel sections, the retaining arms 16 and 18 have a second section 36, where the retaining arms 16 and 18 diverge in this section. A third section 38 in which the retaining arms 16 and 18 run parallel to each other again attaches to this second section. The free ends of the retaining arms 16 and 18 are formed by a first section 40 which points essentially at the axis 41 of the fuel injector 12, that is to say, the free ends of the retaining arms 16 and 18 converge and are inclined towards the base 14. The free ends of the retaining arms 16 and 18 in the area of the first section 40 run essentially radially with respect to the fuel injector 12.

It can be seen clearly from the drawing that the wall thickness d of the retaining arms 16 and 18 in the area of the first, second and third section 40, 38 and 36 is less than in the area connected thereto. This provides increased flexibility for the retaining arms in the area of the free ends.

When the retaining device 10 is pushed onto the fuel injector 12, the first section 40 initially forms a funnel, or a pilot fork, so that the retaining device 10 cannot slip off. The free ends of the first section 40 are bent into the recess identified by reference numeral 40 until the free ends align with the inside surface of the parallel section of the retaining arms 16 and 18. The retaining device 10 can then be pushed fully onto the fuel injector 12. Then the free ends of the first section 40 swing back into their initial position and now stand radially to the axis 41 of the fuel injector 12, that is to say, perpendicular to its outer jacket. The installation force, or the force necessary to push the retaining device 10 on, is reduced because of the inventive design of the retaining device 10 compared with the prior art, whereas the pull-off force is increased since the free ends in the first section are not bent in when the retaining device is pulled off the fuel injector 12, but are subjected to force in the longitudinal direction through their faces.

Preferably the retaining device in accordance with the invention is made of PPA or fiberglass-reinforced PPA.

Finally, it can be seen from FIG. 1 that stiffening ribs 46 are provided on the outer surface 44 of the retaining arms 16 and 18 which run in the direction of the longitudinal axis and come to a point towards the free ends of the retaining arms 16 and 18. The width and the height of the stiffening ribs 46 can decrease.

Figure 3:
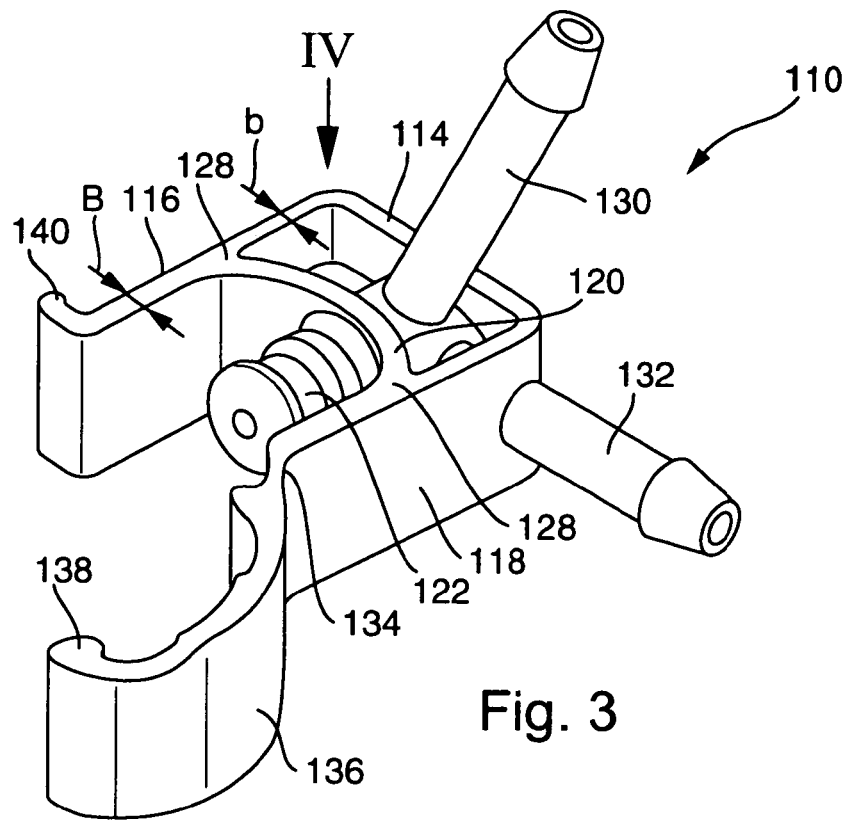
FIG. 3 is a perspective view of a retaining device in accordance with the invention.
Figure 4:
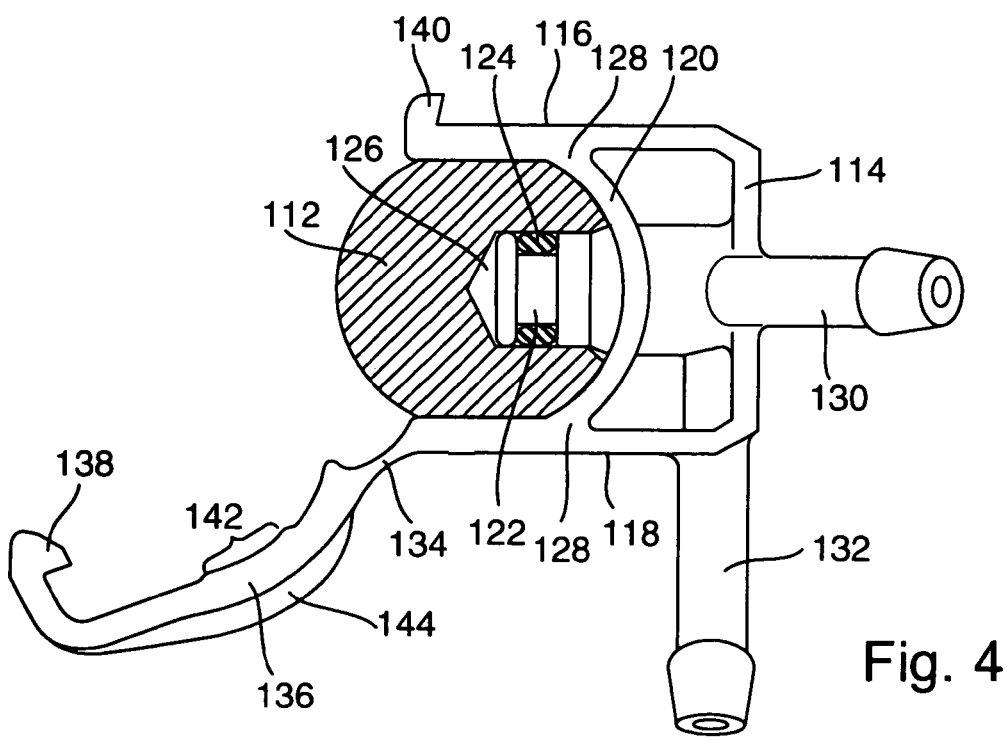
FIG. 4 is a plan view from FIG. 3 in the direction of arrow IV.

FIG. 3 shows a retaining device identified overall as 110 which may be attached to a fuel injector 112 (see FIG. 4). The device 110 has a base 114 which is flanked by two retaining arms 116 and 118. The base 114 is formed by a bridge from which a connecting fitting 130 protrudes for a return line (not shown). This connecting fitting 130 is fluidically connected to a connector 122 which is sealed with an O-ring 124 and sits on return passage 126 for the fuel injector 112. The excess fuel is taken through this return passage 126 from the fuel injector 112 and to the connector 122.

In a center area 128 the two retaining arms 116, 118 are connected to each other through a bridge 120, where this bridge 120 is bent concavely and the connector 122 projects on its concave side. The curve matches the curvature of the fuel injector 112. It can be seen clearly that the wall thickness b of the retaining arms 116 and 118 in the section between the base 114 and the center area 128 is less than the wall thickness B in the section between the center area 128 and the individual free end.

In the area of the base 114, an additional connecting fitting 132 which is fluidically connected to the connecting fitting 130 projects from the retaining arm. A bail 136, whose curvature is less than the curvature of the jacket of the fuel injector 112, is formed onto the free end of the retaining arm 118 by means of a film hinge 134. The free end of the bail 136 is formed by a locking hook 138 which, when the bail 136 is closed, engages a locking tab 140 provided on the free end of the retaining arm 116 facing away from the fuel injector. In the inside of the bail 136 a locating section 142 is provided, by way of which the bail 136 butts against the fuel injector 112. This locating section 142 projects slightly above the slightly concavely curved inner surface. On the outside there is a stiffening rib 144 running in the longitudinal direction of the bail 136 which ensures that the bail 136 engaged in the locking tab 140 butts against the fuel injector 112 under pretension.

With the retaining device 110 in accordance with the invention, it is ensured that the installation force needed to push the retaining device 110 onto the fuel injector 112 is kept low and that, by closing the bail 136 and engaging the locking hook 138 onto the locking tab 140, it is ensured that the retaining device 110 does not detach itself from the fuel injector 112 or loosen. It is possible to pull the retaining device 110 from the fuel injector 112 only after the bail 136 has been opened.

Figure 5:
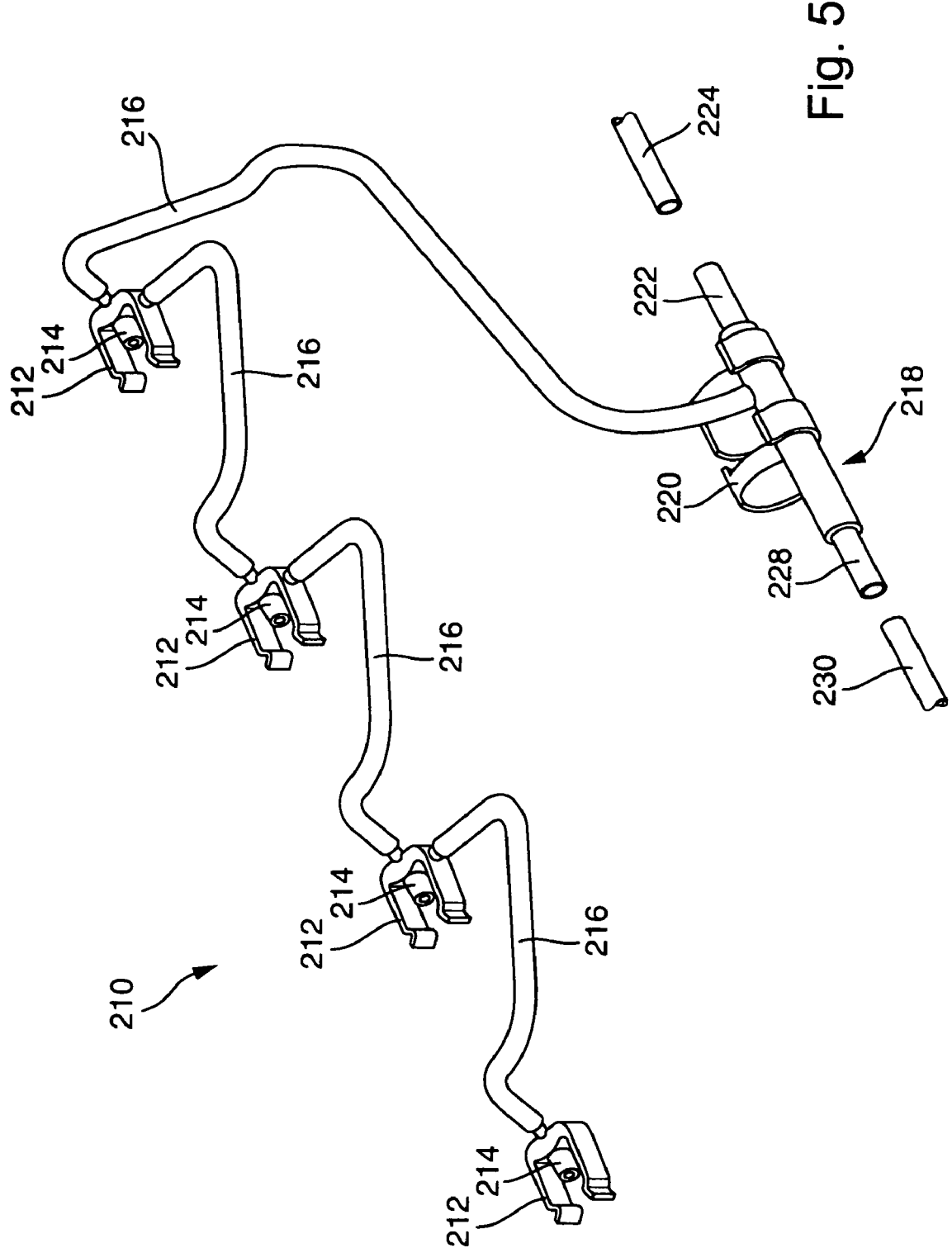
FIG. 5 is a perspective schematic representation of a fuel return system with four retaining devices of a suction device to be attached to fuel injectors, including return lines.

FIG. 5 shows a fuel return system for a 4-cylinder engine identified overall as 210 which has a total of four fuel injectors (not shown) to which retaining devices 212 are clipped. These retaining devices 212 possess connectors 214 which engage a matching socket in the fuel injector. The excess fuel which is taken through the return lines 216 to be suctioned off is taken to the connectors 214 through these sockets. This suction device 218 is attached by a suitable retaining clip 220 to the engine or in the engine compartment.

Figure 6:
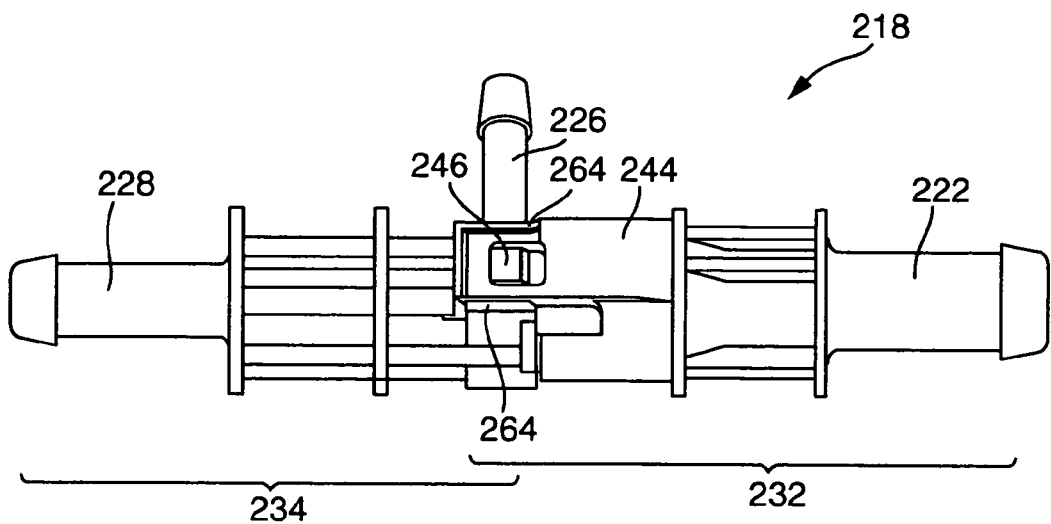
FIG. 6 is a side view of the device.

As can be seen from FIG. 6, the suction device 218 has a first connection 222 to which a high-pressure line 224 can be connected. Fuel under pressure is transported in this high-pressure line 224 towards the suction device 218. In a center area of the suction device 218, there is a second connection 226 to which the return line 216 is connected. A third connection 228 is provided opposite the first connection 222 to which a drain line 230 can be connected. The fuel brought in through the high-pressure line 224 and the return line 216 of the suction device 218 is taken away through this drain line 230, for example, to the tank.

Figure 7:
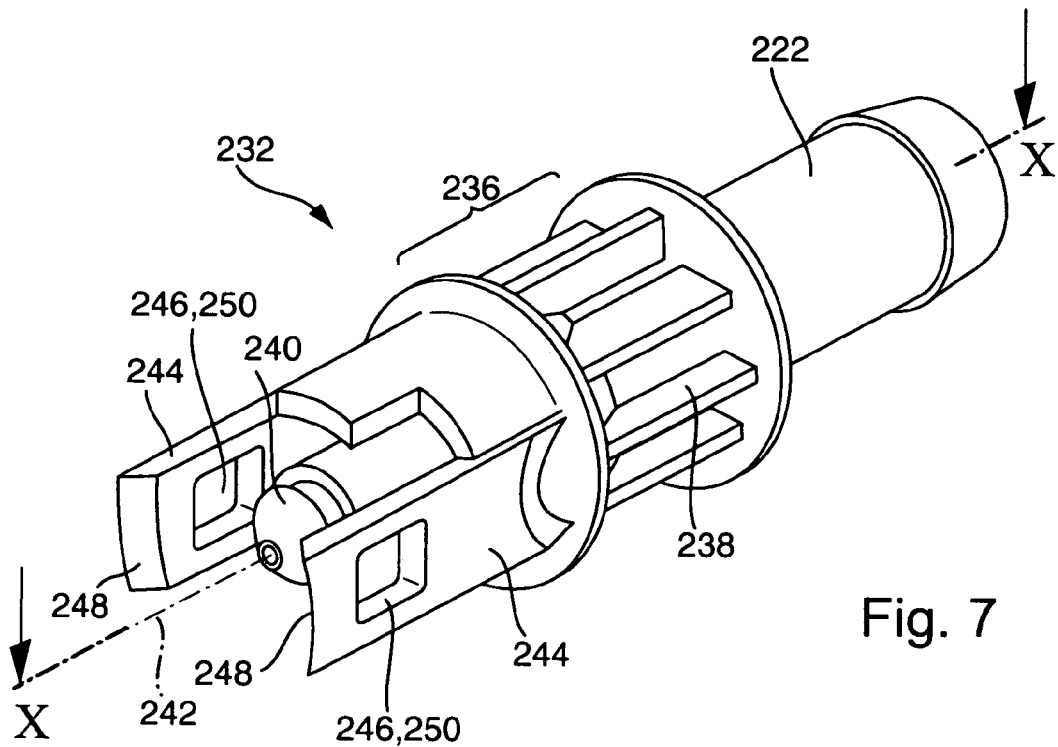
FIG. 7 is a perspective view of a first housing part to be connected to a high-pressure line.
Figure 8:
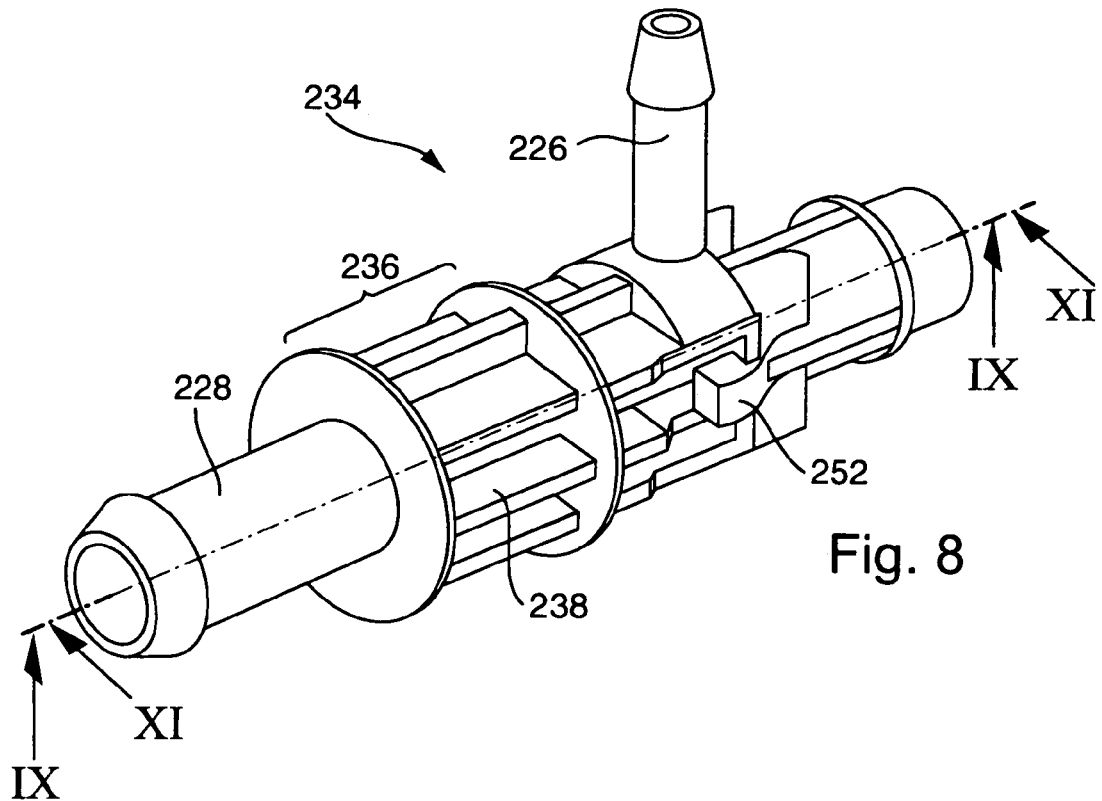
FIG. 8 is a perspective view of a second housing part to be connected to a return line.
Figure 9:
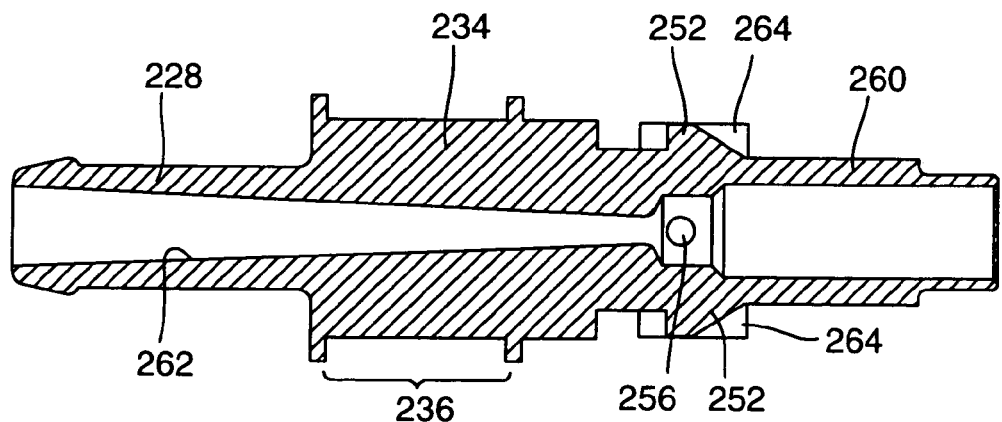
FIG. 9 is a section IX-IX from FIG. 8 through the second housing part.

The suction device 28 consists of a housing part 232, shown in FIG. 7, onto which the first connection 222 is formed and a second housing part 234, which is shown in FIG. 8. The second connection 226 and the third connection 228 project radially or axially from this second housing part 234. In addition, areas 236 can be seen in which housing ribs 238 are provided running in the longitudinal direction, that is to say axially, to which the retaining clip 220 fastens.

A fuel injector 240 which is aligned coaxially to the longitudinal axis 242 of the first housing part 232 is provided opposite the first connection 222. The fuel injector 240 is flanked by two retaining arms 244 located opposite each other whose free ends have leading bevels 248. In addition, the retaining arms 244 are given locking slots 250 which coact, specifically engage, with locking tabs 252 on the second housing part 234. The slots 250 and the tabs 252 form retaining means 246 for the retaining arms 244.

Figure 10:
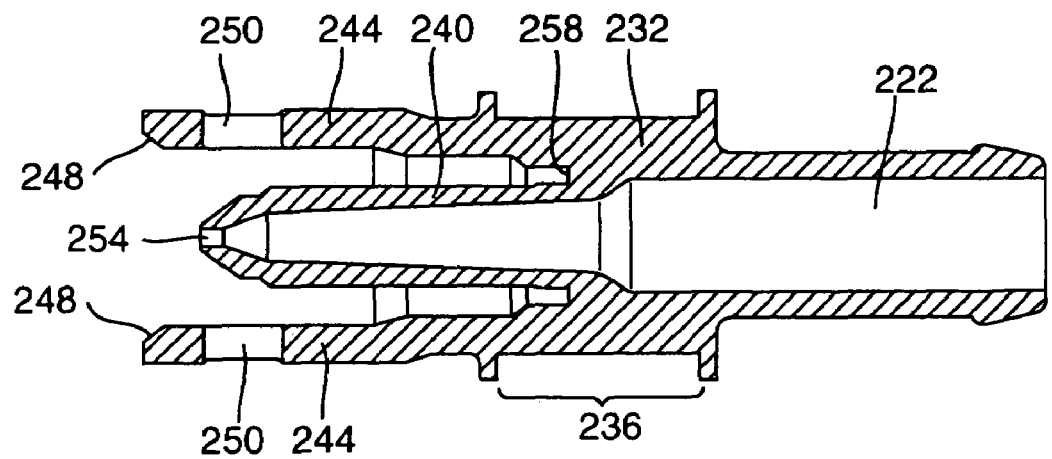
FIG. 10 is a section X-X from FIG. 7 through the second housing part.

It can be seen from FIG. 6 that the first housing part 232 has an essentially cartridge-shaped configuration, in which the injector nozzle 240 extends coaxially and is fluidically connected to the first connection 222. The injector nozzle possesses a narrow injector opening 254 in which the fluid being carried, specifically the fuel being carried, is accelerated to maximum speed. In the immediate vicinity of this injector opening is the opening 56 of the second connection 226 through which the fuel is suctioned off from the return line 216 through the negative pressure generated. The exact alignment of the opening 256 relative to the nozzle opening 254 is achieved by a stop 258 on the first housing part 232 for an insertion sleeve 260 which is formed coaxially onto the second housing part 234 and surrounds the injector nozzle. The diffuser required for the venturi system can be seen in the second housing part 234. In addition, two longitudinal guides 264, which abut the retaining arms 244 laterally when they are latched to the locking tabs 252, can be seen in the views of the second housing part shown in FIGS. 10 and 11. These longitudinal guides 264 prevent the two housing parts 232 and 234 from being rotated relative to each other in their latched position.

Figure 11:
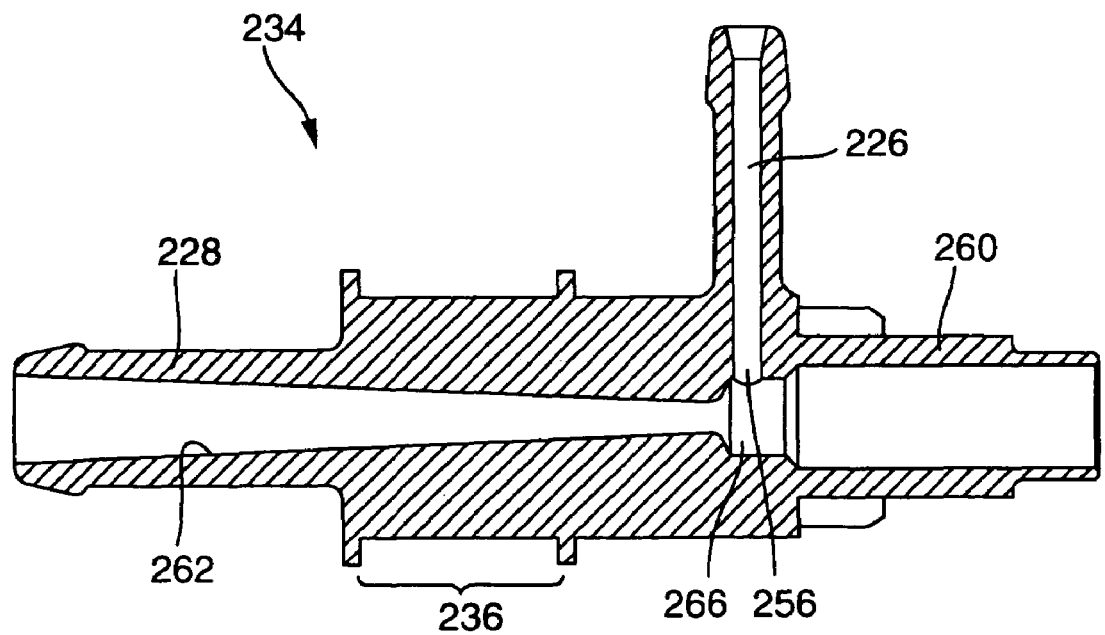
FIG. 11 is a section XI-XI from FIG. 8 through the second housing part.

The outlet or opening 256 of the second connection 226, that is the opening 256 in the flow duct 266 of the venturi system, is shown in FIG. 11. This opening 256 lies in a defined position relative to the nozzle opening 254 when the housing parts 232 and 234 are latched.

The design of the device 218 with two housing parts 232 and 234 in accordance with the invention has the considerable advantage that it can manufactured and assembled easily and warehousing costs are reduced.

What is claimed is:

1. A device to attach a fuel return line to a fuel injector with a C-shaped main body partially encircling the fuel injector having two retaining arms, where the retaining arms lie against the fuel injector and grip the fuel injector from the back at least to a small degree, having a connector co-acting with a drain passage on the fuel injector and with at least one connecting fitting for the fuel return line, where the connecting fitting and the connector are fluidically connected, characterized in that free ends of the retaining arms have a first section in which the free ends are angled towards each other and towards a base of the main body.

2. A device in accordance with claim 1, wherein the retaining arms run at least parallel starting from the base of the main body and have a second section in the area of the free ends in which the retaining arms diverge.

3. A device in accordance with claim 2, wherein a third section, in which the retaining arms run parallel, attaches to the second section.

4. A device in accordance with claim 3, wherein the first section attaches to the third section.

5. A device in accordance with claim 3, wherein the thickness of the retaining arms is less in one of the first, second and third sections than at the foot of the retaining arms.

6. A device in accordance with claim 1, wherein the thickness (D) of the retaining arms decreases towards the free ends.

7. A device in accordance with claim 1, wherein a slot open at the edge is provided between the base of the main body and the retaining arms, oriented towards the free ends of the retaining arms.

8. A device in accordance with claim 1, wherein the free ends of the retaining arms can be moved flexibly far enough from each other until the free ends align with facing inner surfaces of parallel sections of the retaining arms.

9. A device in accordance with claim 1, wherein the retaining arms abut the fuel injector under spring tension.

10. A device in accordance with claim 1, wherein the retaining arms have stiffening ribs running a longitudinal direction on outer surfaces facing away from each other.

11. A device in accordance with claim 10, wherein the stiffening ribs come to a wedge-shaped point towards the free ends of the stiffening ribs.

12. A device to attach a fuel return line to a fuel injector with an essentially C-shaped main body partially encircling the fuel injector having two retaining arms, where the retaining arms abut the fuel injector, with a connector co-acting with a drain passage for the fuel injector and with at least one connecting fitting for the fuel return line, where the connecting fitting and the connector are fluidically connected to each other, characterized in that free ends of the retaining arms are connected through a bail extending behind the fuel injector.

13. A device in accordance with claim 12, wherein the retaining arms run substantially parallel starting from a base.

14. A device in accordance with claim 12, wherein the bail is connected to both free ends of the retaining arms.

15. A device in accordance with claim 12, wherein the bail is formed on one end of one retaining arm.

16. A device in accordance with claim 15, wherein the bail is connected by means of a film hinge to the free end of one retaining arm.

17. A device in accordance with claim 11, wherein the bail is latched to at least one free end of one retaining arm.

18. A device in accordance with claim 17, wherein the end of the retaining arm has a locking tab.

19. A device in accordance with claim 18, wherein the locking tab is formed on a longitudinal side facing away from the other retaining arm.

20. A device in accordance with claims 11 wherein the two retaining arms are connected at their base and in an area between the base and the free ends.

21. A device in accordance with claim 20, wherein the area lies in the middle between the base and the free ends of the retaining arms.

22. A device in accordance with claim 20, wherein the retaining arms are connected by a bridge.

23. A device in accordance with claim 22, wherein the bridge is bent concavely in the direction of the connector.

24. A device in accordance with claim 20, wherein a wall thickness (B) of the retaining arm between the free ends and the connecting area is greater than a wall thickness (b) between the connecting area and the base.

25. A device in accordance with claim 20, wherein the connecting area forms a joint for the retaining arms.

26. A device in accordance with claim 12, wherein the bail is provided with an added stiffening rib running in a longitudinal direction.

27. A device for suctioning fuel from a fuel injector which is fluidically connected by way of a return line to the device, with a first connection for a high-pressure line, a second connection for the return line, and a third connection for a drain line, wherein the connections are connected to a venturi system and the first connection opens into an injector nozzle and the second connection opens in the area of a nozzle opening, wherein the first connection is formed, on a first housing part of the device and the third connection is formed on a second housing part.

28. A device in accordance with claim 27, wherein the injector nozzle is formed onto the first housing part.

29. A device in accordance with claim 27, wherein the first housing part is essentially cartridge-shaped and the injector nozzle is located coaxially in the first housing part.

30. A device in accordance with claim 27, wherein the second connection is formed on one of the first and the second housing part.

31. A device in accordance with claim 27, wherein the second housing part has a cartridge-shaped axial extension which encloses the injector nozzle.

32. A device in accordance with claim 27, wherein retaining arms extending in the axial direction are provided on one of the first housing part partially surrounding the second housing part and on one of the second housing part partially surrounding the first housing part.

33. A device in accordance with claim 32, wherein the retaining arms are configured as locking arms.

34. A device in accordance with claim 32, wherein two oppositely located retaining arms are provided.

35. A device in accordance with claim 32, wherein the second housing part has retaining means for the retaining arms.

36. A device in accordance with claim 35, wherein the retaining means have one of locking tabs and locking slots and the retaining arms have one of locking slots and locking tabs.

37. A device in accordance with claim 32, wherein the second housing part is provided with longitudinal guides for the retaining arms.

38. A device in accordance with claim 37, wherein the longitudinal guides lie laterally next to the retaining arms.

39. A device in accordance with claim 37, wherein at least two longitudinal guides locate a retaining arm.

40. A device in accordance with claim 37, wherein the longitudinal guide supports the retaining arm in the peripheral direction.

41. A device in accordance with claim 37, wherein the longitudinal guide is formed by one of a projection and a recess running radially in the longitudinal direction.

* * * * *